(12) United States Patent
Bae et al.

(10) Patent No.: US 8,983,404 B2
(45) Date of Patent: Mar. 17, 2015

(54) METHOD AND APPARATUS FOR PROVIDING CONTENT

(75) Inventors: Joo-yoon Bae, Seoul (KR); Tae-young Kang, Seoul (KR); Jung-ho Kim, Chungcheongnam-do (KR); Yong-gook Park, Gyeonggi-do (KR); Ho-jun Lee, Gyeonggi-do (KR); Hee-chul Jeon, Gyeonggi-do (KR); Sang-ok Cha, Daegu (KR); Won-young Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 201 days.

(21) Appl. No.: 13/595,562

(22) Filed: Aug. 27, 2012

(65) Prior Publication Data
US 2013/0084813 A1  Apr. 4, 2013

(30) Foreign Application Priority Data
Sep. 29, 2011 (KR) .................. 10-2011-0098939

(51) Int. Cl.
*H04B 1/38* (2006.01)
*H04W 4/02* (2009.01)
*G06Q 10/02* (2012.01)
*H04M 1/725* (2006.01)

(52) U.S. Cl.
CPC ............. *H04W 4/021* (2013.01); *G06Q 10/02* (2013.01); *H04M 1/7253* (2013.01)
USPC .... 455/90.1; 455/41.2; 455/414.3; 455/456.2

(58) Field of Classification Search
USPC ........ 455/90.1, 41.1, 41.2, 414.1–414.3, 422, 455/456.1, 456.2, 507, 517
See application file for complete search history.

(56) References Cited

U.S. PATENT DOCUMENTS

| 5,604,765 | A | 2/1997 | Bruno et al. |
| 6,031,490 | A | 2/2000 | Forssen et al. |
| 7,046,790 | B2 * | 5/2006 | Holmen .................. 379/266.01 |
| 7,769,596 | B1 * | 8/2010 | Nair ............................. 705/1.1 |
| 2009/0325629 | A1 | 12/2009 | Snyder |

FOREIGN PATENT DOCUMENTS

| JP | 2004145595 | 5/2004 |
| KR | 1020050082210 | 8/2005 |
| KR | 1020090061087 | 6/2009 |

* cited by examiner

*Primary Examiner* — Nhan Le
(74) *Attorney, Agent, or Firm* — The Farrell Law Firm, P.C.

(57) ABSTRACT

A method of providing content is provided. The method includes providing an interface for providing a service based on information regarding a wireless transceiver positioned close to an apparatus for providing content, the information being received from the wireless transceiver; requesting a waiting number for providing the service via the interface; and receiving the waiting number for providing the service, a waiting time, and content based on the waiting time.

13 Claims, 7 Drawing Sheets

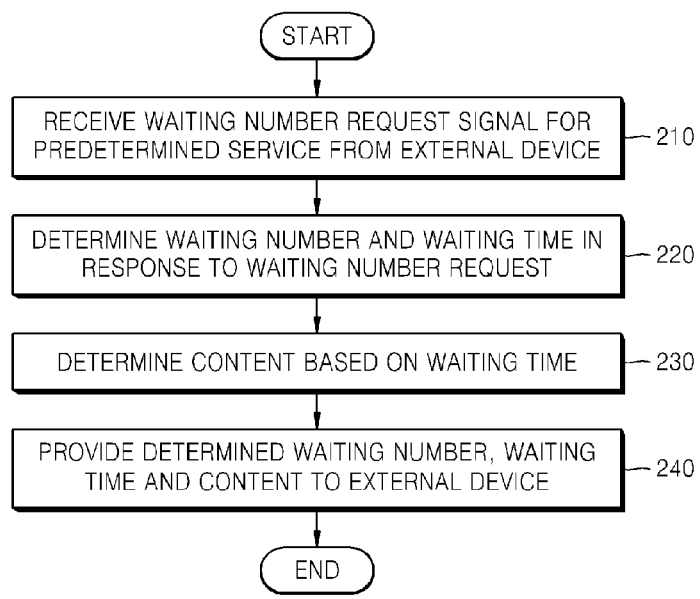

FIG. 6

| | CONTENT TYPE (610) | ELEMENT (620) | ADDRESS (LOCATION) (630) | REQUIRED TIME (640) |
|---|---|---|---|---|
| 601 | ADVERTISING | URL | | 00:03:30 |
| 602 | MUSIC | URL | | 00:04:20 |
| 603 | VIDEO | URL | | 00:28:40 |
| 604 | PERIPHERAL SPECTACLE | URL OR TEXT | | 00:50:00 |
| 605 | RECOMMENDED ACTIVITY | URL OR TEXT | FIRST FLOOR OF 'AA' DEPARTMENT | 00:25:00 |

START
↓
RECEIVE PARTICULAR INFORMATION REGARDING WIRELESS TRANSCEIVER FROM WIRELESS TRANSCEIVER THAT IS DISPOSED CLOSE TO APPARATUS FOR PROVIDING CONTENT — 710
↓
PROVIDE INTERFACE FOR PROVIDING PREDETERMINED SERVICE — 720
↓
REQUEST WAITING NUMBER FOR PROVIDING SERVICE VIA INTERFACE — 730
↓
RECEIVE WAITING NUMBER FOR SERVICE, WAITING TIME, AND CONTENT BASED ON WAITING TIME — 740
↓
END

METHOD AND APPARATUS FOR PROVIDING CONTENT

PRIORITY

This application claims priority under 35 U.S.C. §119(a) to Patent Application No. 10-2011-0098939 filed on Sep. 29, 2011 in the Korean Intellectual Property Office, the entire disclosure of which is incorporated herein by reference.

BACKGROUND OF THE INVENTION

1. Field of the Invention

The present invention relates generally to a method and apparatus for providing content, and more particularly, to a method and apparatus for providing content relating to the issuance of tickets to hold one's place in line, i.e., a ticket which includes a waiting number and a waiting time.

2. Description of the Related Art

In systems for issuing waiting number tickets, a user pulls a paper ticket with a number out of an apparatus for issuing waiting number tickets at a particular place. The user then awaits the user's own turn, or when the user's own number is called by a number calling machine while the user holds a vibration call receiver. Thus, the user has to watch a number calling monitor carefully until the user's number is called by the calling machine or must hold the vibration call receiver without leaving the location.

General systems for issuing waiting number tickets involve a process of finding the apparatus for issuing waiting number tickets and pulling out a paper waiting number ticket from the apparatus in the store so as to check the user's turn and then watching the number calling machine carefully and when the user's number is called, the desired service is provided to the user. Thus, there is a problem of unnecessarily wasting paper resources. Additionally, in the case of a user who has to await their turn for a long time, the user has to check a called number whenever the number calling machine is rung so as to check whether it is the user's own turn. Thus, the user cannot perform another task that involves going out of the store even if there is a long waiting time and thus, wastes their own time in the store.

SUMMARY OF THE INVENTION

The present invention provides a method and apparatus for providing content relating to electronic issuance of waiting numbers and a waiting time.

According to an aspect of the present invention, a method of providing content is provided. The method includes providing an interface for providing a service based on information regarding a wireless transceiver positioned close to an apparatus for providing content, the information being received from the wireless transceiver; requesting a waiting number for providing the service via the interface; and receiving the waiting number for providing the service, a waiting time, and content based on the waiting time.

According to another aspect of the present invention, a method of providing content is provided. The method includes receiving a waiting number request signal for a predetermined service from an external device; determining a waiting number and a waiting time in response to the waiting number request signal; determining content based on the waiting time; and providing the determined waiting number, waiting time, and content to the external device.

According to another aspect of the present invention, an apparatus for providing content is provided. The apparatus includes a controller for providing an interface for providing a predetermined service based on particular information regarding a wireless transceiver that is disposed positioned close to an apparatus for providing content, the particular information being received from the wireless transceiver; and a communication unit for requesting a waiting number for providing the predetermined service via the interface and for receiving the waiting number for providing the predetermined service, a waiting time, and content based on the waiting time.

According to another aspect of the present invention, an apparatus for providing content is provided. The apparatus includes a communication unit for receiving a waiting number request signal for a predetermined service from an external device; and a controller for determining a waiting number and a waiting time in response to the waiting number request signal, determining content based on the waiting time, and providing the determined waiting number, waiting time, and content to the external device.

BRIEF DESCRIPTION OF THE DRAWINGS

The above and other aspects, features and advantages of the present invention will become more apparent by describing in detail embodiments thereof with reference to the attached drawings in which:

FIG. 2 is a flowchart illustrating a method of providing content from a server, according to an embodiment of the present invention;

FIG. 3 illustrates a waiting number-related table that is stored in an apparatus for storing content, according to an embodiment of the present invention;

FIG. 6 illustrates a content list table that is stored in an apparatus for storing content, according to an embodiment of the present invention;

FIG. 7 is a flowchart illustrating a method of providing content at a terminal, according to an embodiment of the present invention;

DETAILED DESCRIPTION OF EMBODIMENTS OF THE PRESENT INVENTION

The present invention will now be described more fully with reference to the accompanying drawings, in which embodiments of the invention are shown.

Figure 1:
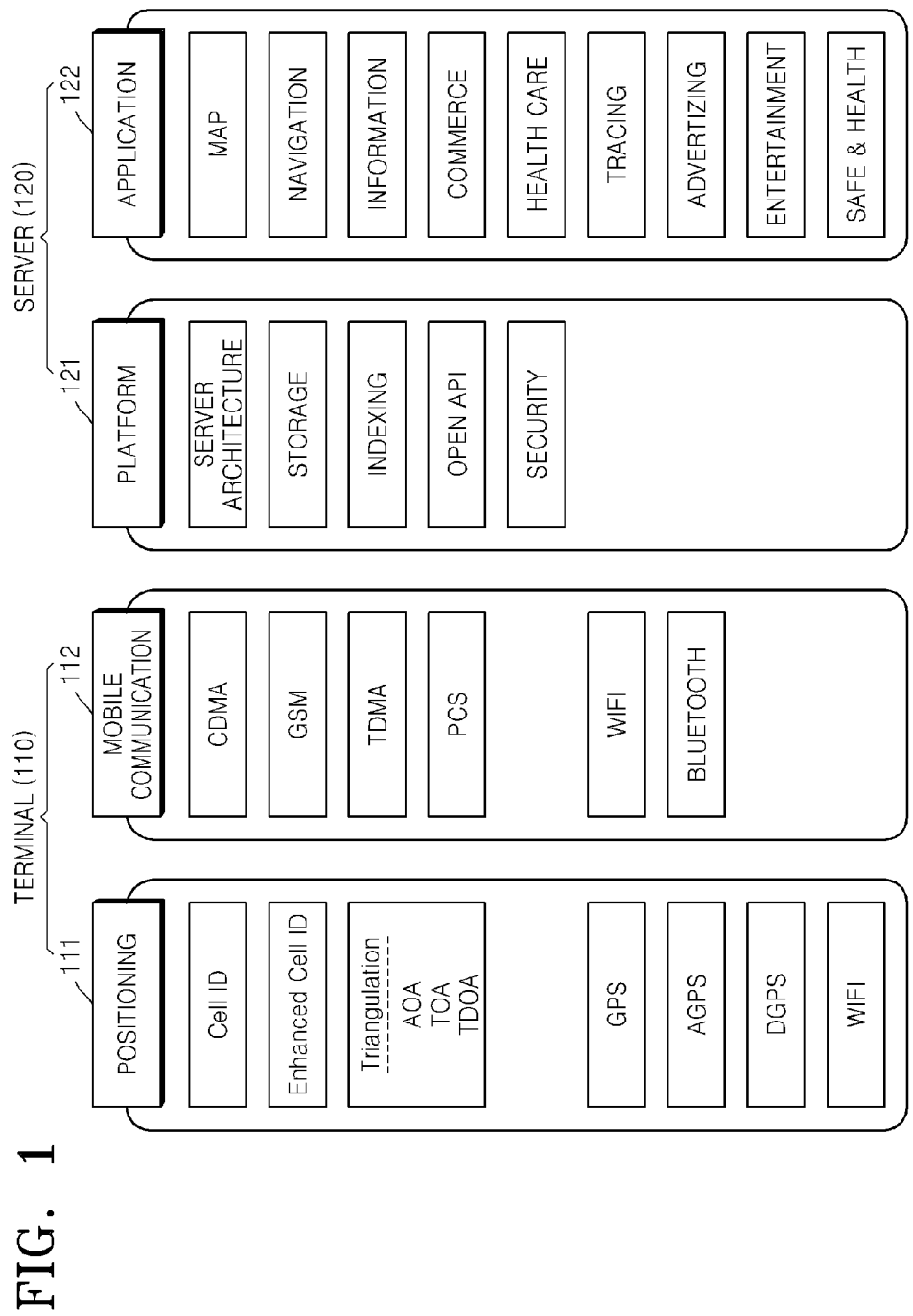
FIG. 1 illustrates a system for providing a location-based service according to an embodiment of the present invention.

FIG. 1 illustrates a system for providing a location-based service according to an embodiment of the present invention.

The system for providing a location-based service includes a terminal side 110 and a server side 120. The terminal side 110 includes a positioning module 111 and a mobile communication module 112. The server side 120 includes a platform 121 and an application 122.

The positioning module 111 is a module for checking a location of the terminal side 110 by using techniques, such as cell IDentificationu (ID), enhanced cell ID, triangulation including Angle of Arrival (AoA), Time of Arrival (ToA), and Time Difference of Arrival (TDoA), Global Positioning System (GPS), Assisted GPS (AGPS), Differential GPS (DGPS), and Wireless Fidelity (WiFi®).

The mobile communication module 112 is a module for performing communication between the terminal side 110 and the server side 120 that uses techniques relating to mobile communication, such as Code Division Multiple Access (CDMA), Global System for Mobile Communications (GSM), Time Division Multiple Access (TDMA) or a Personal Communication Service (PCS) and techniques relating to Near Field Communication (NFC), such as WiFi® or Bluetooth®.

The platform 121 includes certain technologies, such as server architecture, storage, indexing, open Application Programmer Interface (API), and security. Server architecture technology refers to a location-based processing technique that corresponds to a location-based function, such as obtaining a location from a location-obtaining server and responding to a location information request of the terminal side 110 (i.e., client), managing location information and processing of location information regarding an individual or a group, and tracing a movement path. Storage technology refers to a technology for storing and managing information with a large capacity. indexing technology refers to a technology for organizing location information itself or information regarding the location information in an optimized form and arranging them so as to easily search therefor. The open API technology refers to a technology that enables websites to interact with each other by providing location information and information regarding the location information. The security technology refers to a technology of controlling user access, such as user profile management, authorization, and security.

The application 122 refers to an application for providing a location-based service to the terminal side 110. Examples of the application 122 include map, navigation, information, commerce, health care, tracing, advertising, entertainment, health and safety, and the like.

FIG. 2 is a flowchart illustrating a method of providing content from a server, according to an embodiment of the present invention.

Referring to FIG. 2, in step 210, an apparatus for performing a method of providing content (an apparatus for providing content) receives a waiting number request signal for a predetermined service from an external device. The apparatus for providing content is a server. When the external device enters a predetermined zone, i.e., when particular information is received from a wireless transceiver, for example, an Access Point (AP), the external device requests a waiting number for a predetermined service based on the received particular information to the apparatus for providing content. The particular information includes an address of the apparatus for providing content. Moreover, the apparatus for providing content receives an address of the external device, for example, an address of a WiFi® card or an ID of the external device, from the external device. The waiting number request signal includes particular information regarding the wireless transceiver. The particular information regarding the AP that is the wireless transceiver includes at least one of Service Set IDentification (SSID) and Media Access Control (MAC) addresses.

In step 220, the apparatus for providing content determines waiting numbers and a waiting time for the predetermined service in response to the waiting number request of the external device. The apparatus for providing content stores a table showing a waiting number, the current turn, a waiting time, and a waiting WiFi® address for the predetermined service. The table is updated whenever its field is modified. The waiting number refers to a turn at which a task for a predetermined service is to be performed, and the current turn refers to a turn at which the work is being currently performed. The waiting time is obtained by, on average, multiplying time required to provide a predetermined service by a value that is obtained by subtracting the current turn from waiting numbers. When a waiting turn in the table refers to a turn that is currently issued, the waiting time is obtained by, on average, multiplying a time required to provide a predetermined service by a value is obtained by subtracting the current turn from a value added to a waiting number by 1. The waiting time is set by a manager of the apparatus for providing content. The waiting WiFi® address is an example of an address of the external device that requests the waiting number and is received from the external device or is previously recognized by the apparatus for providing content from the particular information regarding the wireless transceiver.

According to another embodiment of the present invention, when the apparatus for providing content receives the waiting number request signal for the predetermined service from the external device and there is a detailed service item regarding the predetermined service, the apparatus for providing content transmits the detailed service item to the external device and receives the waiting number request signal for the detailed service item from the external device. As described above, when the external device supports the detailed service item, the aforementioned step is omitted.

FIG. 3 illustrates a waiting number-related table 300 stored in an apparatus for storing content, according to an embodiment of the present invention.

Referring to FIG. 3, the waiting number-related table 300 is a waiting number-related table for a bank service. The waiting number-related table 300 includes fields, such as a menu 310, a waiting number 320, a current turn 330, a waiting time 340, and a waiting WiFi® address 350.

Figure 5:
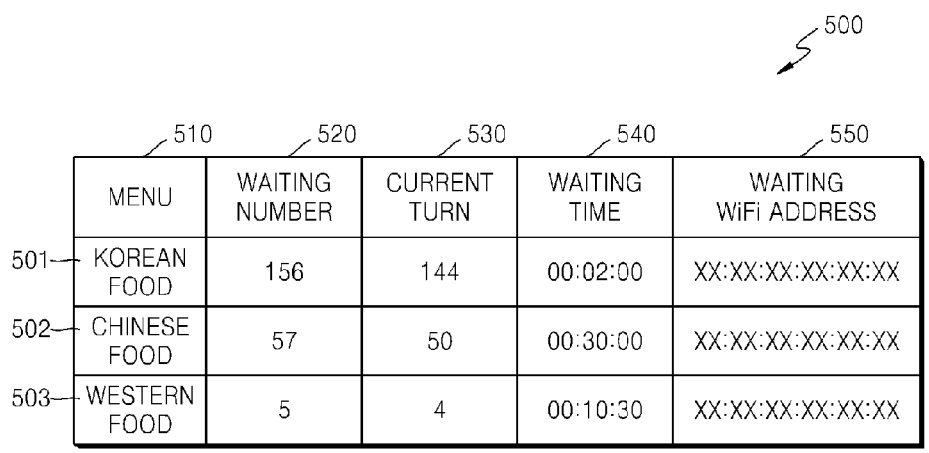
FIG. 5 illustrates a waiting number-related table that is stored in an apparatus for storing content, according to an embodiment of the present invention.

Moreover, FIG. 5 illustrates a waiting number-related table 500 that is stored in an apparatus for storing content, according to an embodiment of the present invention.

Referring to FIG. 5, the waiting number-related table 500 is a waiting number-related table for a food ordering service. The waiting number-related table 500 includes fields such as a menu 510, a waiting number 520, a current turn 530, a waiting time 540, and a waiting WiFi® address 550.

In step 230, the apparatus for providing content determines content based on the waiting time. The apparatus for providing content determines content that is used by a user of the external device, for example, an advertisement, music, a video, data for a peripheral spectacle, a recommended activity, and the like, according to the remaining waiting time. For example, when the waiting time is 30 minutes, the apparatus for providing content determines content that is displayed in the next 30 minutes. The apparatus for providing content determines content by using a content table that is already stored in the apparatus for providing content or by a recommendation of an external server. Moreover, the apparatus for providing content stores content itself by using the external device or provides an address from which content is obtained, to the external device.

Furthermore, when detecting a location of the external device that requests a waiting number, the apparatus for providing content determines content relating to the waiting time and the location of the external device. The apparatus for providing content detects the location of the external device based on particular information of the wireless transceiver that is positioned close to the external device. In this case, the apparatus for providing content has to be connected to the wireless transceiver, or the location of the wireless transceiver has to be already stored based on the SSID or MAC address of the wireless transceiver.

Figure 4:
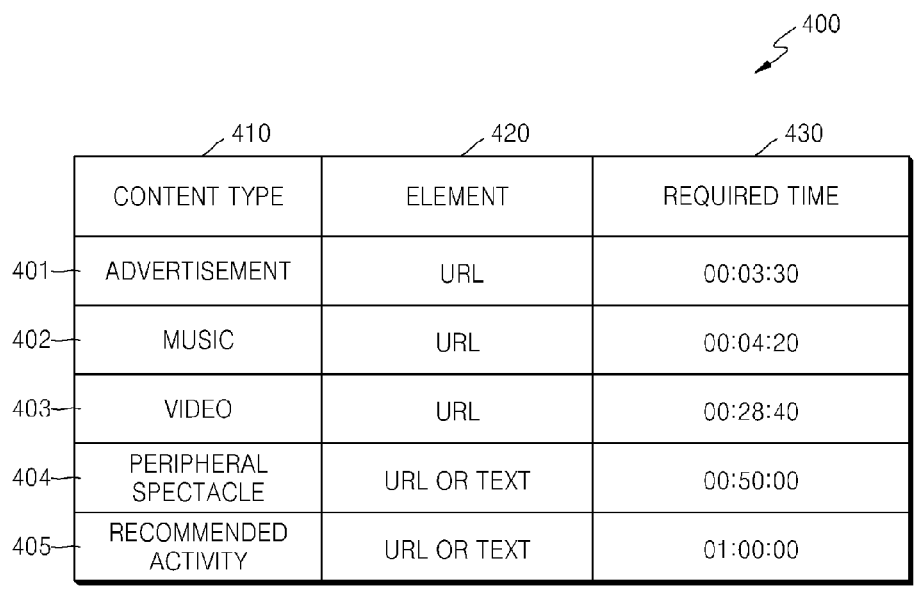
FIG. 4 illustrates a content list table that is stored in an apparatus for storing content, according to an embodiment of the present invention.

FIG. 4 illustrates a content list table 400 that is stored in an apparatus for storing content, according to an embodiment of the present invention.

Referring to FIG. 4, the content list table 400 includes fields, such as a content type 410, an element 420, and a required time period 430. Referring to FIGS. 3 and 4, for example, when the user of the external device requests a waiting number for the service menu 420 regarding a loan, the apparatus for providing content determines that a waiting time is 30 minutes and determines an advertisement 401, music 402, and a video 403 as content that will be displayed within the following 30 minutes. For example, the apparatus for providing content determines the video 403 is displayed for a time that is the closest to 30 minutes.

FIG. 6 illustrates a content list table 600 that is stored in an apparatus for storing content, according to an embodiment of the present invention.

Referring to FIG. 6, the content list table 600 includes fields, such as a content type 610, an element 620, an address or location 630, and a required time period 640. Referring to FIGS. 5 and 6, for example, when the user of the external device requests a waiting number for a service menu regarding Chinese food, the apparatus for providing content determines that a waiting time is 30 minutes and determines an advertisement 601, music 602, a video 603, and a recommended activity 605 as content that is displayed in the next minutes. When the location of the external device is a first floor of a "AA department store", the apparatus for providing content determines the recommended activity 605 having a required time period that is close to 30 minutes and corresponding to the location of the external device, as content.

In step 240, the apparatus for providing content provides the determined waiting number, waiting time, and content to the external device. The apparatus for providing content provides the waiting number, the waiting time, and content directly to the external device. Moreover, when the apparatus for providing content is connected to the wireless transceiver, it provides the waiting number, the waiting time, and the content to the external device via the wireless transceiver.

When the user of the external device uses the provided content, the apparatus for providing content provides a predetermined profit or benefit to the user of the external device. The predetermined profit or benefit is provided by providers of the content to be used.

FIG. 7 is a flowchart illustrating a method of providing content at a terminal, according to an embodiment of the present invention.

Referring to FIG. 7, in step 710, the apparatus for providing content receives particular information regarding the wireless transceiver from the wireless transceiver that is positioned in close proximity to the apparatus for providing content. The apparatus for providing content in FIG. 7 is a terminal. When entering a zone in which the wireless transceiver can receive a broadcasting signal, the apparatus for providing content receives the particular information from the wireless transceiver. Additionally, the wireless transceiver includes address information regarding a server for providing a service based on the particular information. The wireless transceiver is an AP, and the particular information regarding the wireless transceiver includes at least one of SSID and MAC addresses.

In step 720, the apparatus for providing content provides an interface for providing a predetermined service. The apparatus for providing content extracts service information regarding a service to be provided from the SSID or MAC address of the wireless transceiver and provides an interface for the service. For example, when the SSID of the wireless transceiver is a "system of BB bank", the apparatus for providing content provides an interface for the system. Additionally, the interface includes an interface for a detailed service item. According to another embodiment of the present invention, the apparatus for providing content receives the service information from the server when there is no detailed service item.

Figure 8A:
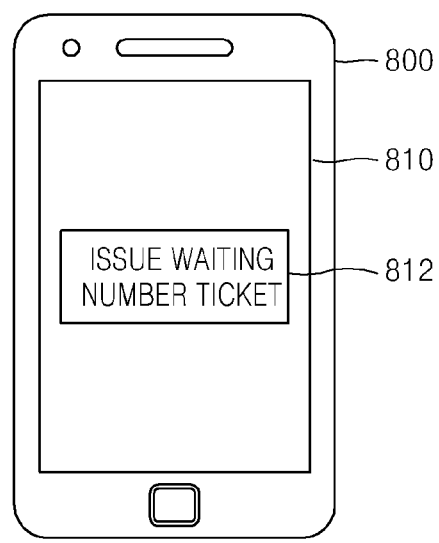
FIGS. 8A and 8B illustrate interfaces regarding a waiting number issuance service, according to an embodiment of the present invention.
Figure 8B:
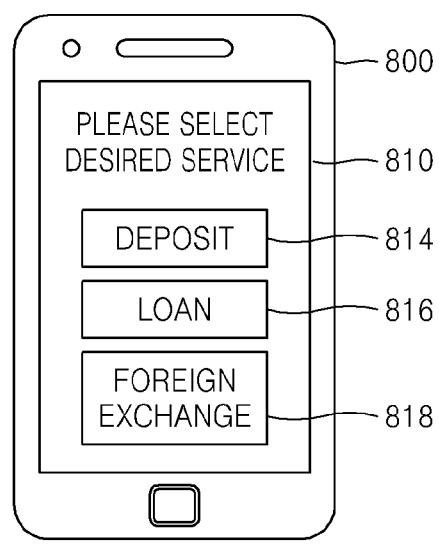

FIGS. 8A and 8B illustrate interfaces regarding a waiting number issuance service, according to an embodiment of the present invention.

Referring to FIG. 8A, a mobile device 800 that is an apparatus for providing content provides a waiting number interface 810. A button 812 for requesting a waiting number to a server is provided to the waiting number interface 810. Referring to FIG. 8B, detailed service items 814 through 818 are provided to the waiting number interface 810.

In step 730, the apparatus for providing content transmits the waiting number request for providing a service to a waiting number providing server via an interface. When button 812 of FIG. 8A or 8B is activated, the apparatus for providing content transmits a waiting number request signal.

In step 740, the apparatus for providing content receives a waiting number for the service, a waiting time, and content based on the waiting time. The apparatus for providing content then outputs the received waiting number, waiting time, and content based on the waiting time.

Figure 9:
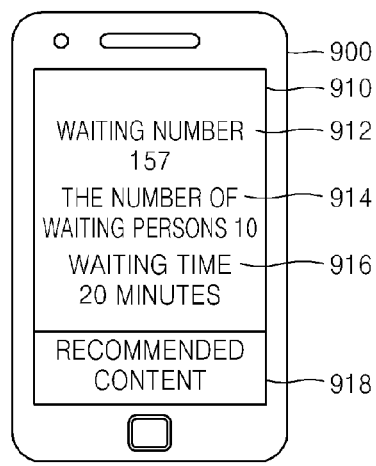
FIG. 9 illustrates a screen on which waiting numbers, a waiting time, and content based on the waiting time are displayed, according to an embodiment of the present invention.

FIG. 9 illustrates a screen including waiting numbers, a waiting time, and content based on the waiting time are displayed, according to an embodiment of the present invention. A mobile device 900 that is an apparatus for providing content outputs a waiting number 912, a waiting time 916, and recommended content 918. The number of persons waiting 914 is an option.

Moreover, when a user of the apparatus for providing content uses content, the apparatus for providing content receives a predetermined profit or benefit. The predetermined profit or benefit is provided by providers of content to be used.

Figure 10:
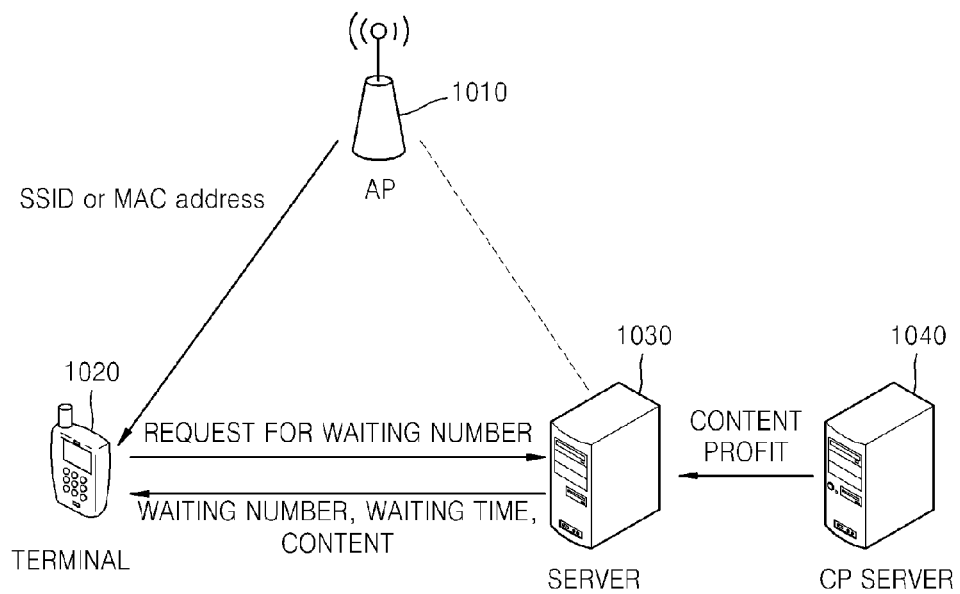
FIG. 10 illustrates a system for issuing waiting number tickets, according to an embodiment of the present invention.

FIG. 10 illustrates a system for issuing waiting number tickets, according to an embodiment of the present invention.

Referring to FIG. 10, when a terminal 1020 is positioned close to an AP 1010, the terminal 1020 receives the SSID or MAC address from the AP 1010. The terminal 1020 then determines a waiting number issuing service to be provided and requests a server 1030 to provide a waiting number based on the SSID or MAC address. The server 1030 then determines a waiting number and a waiting time and determines content to provide based on the waiting time and/or a location of the terminal 1020. The server 1030 provides the waiting number, the waiting time, and the content to the terminal 1020. In this regard, the server 1030 provides a predetermined profit to the terminal 1020. The predetermined profit is provided by a Content Provider (CP) server 1040 and is provided to the terminal 1020.

Figure 11:
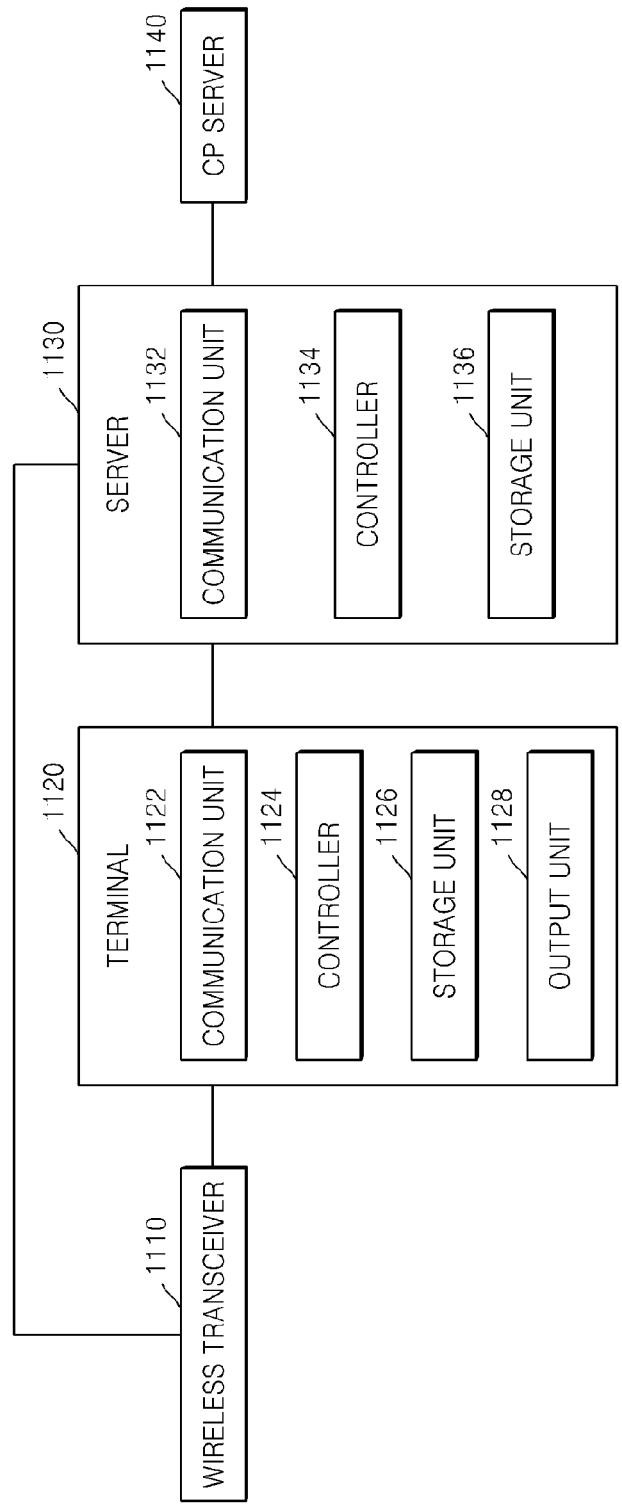
FIG. 11 illustrates a system for providing content, according to an embodiment of the present invention.

FIG. 11 illustrates a system for providing content, according to an embodiment of the present invention.

Referring to FIG. 11, the system for providing content includes a terminal 1120 and a server 1130. The terminal 1120 includes a communication unit 1122, a controller 1124, a storage unit 1126 and an output unit 1128. The server 1130 includes a communication unit 1132, a controller 1134, and a storage unit 1136. The terminal 1120 enters a zone in which it is positioned close to a wireless transceiver 1110, and the wireless transceiver 1110 is connected to the server 1130.

The communication unit 1132 of the server 1130 receives a waiting number request signal for a predetermined service from the terminal 1120. When the terminal 1120 enters a predetermined zone, i.e., when the terminal 1120 receives particular information from the wireless transceiver 1110, for example, an AP, the terminal 1120 requests that the server 1130 provide a waiting number for a service based on the received particular information. The particular information includes an address of the server 1130. Additionally, the communication unit 1132 of the server 1130 receives an address of the terminal 1120, for example, a WiFi® address or an ID of the terminal 1120, from the terminal 1120. The waiting number request signal includes the particular information regarding the wireless transceiver 1110. The particular information regarding the AP that is the wireless transceiver 1110 includes at least one of SSID and MAC addresses.

The controller 1134 of the server 1130 determines a waiting number and a waiting time for the service in response to the waiting number request of the terminal 1120. The storage unit 1136 of the server 1130 stores a table showing a waiting number for a predetermined service, a current turn, a waiting time, and a waiting WiFi® address. The table is updated when its fields are modified. The waiting number refers to a turn at which a task for a predetermined service is to be handled, and the current turn refers to a turn in which the task is being currently handled. The waiting time is obtained by, on average, multiplying a time required to provide a predetermined service by a value that is obtained by subtracting the current turn from waiting numbers. When a waiting turn in the table refers to a turn that is currently issued, the waiting time is obtained by, on average, multiplying the time required to provide a predetermined service by a value that is obtained by subtracting the current turn from a value added to a waiting number by 1. The waiting time is set by the server 1130. The waiting WiFi® address is an example of an address of the terminal 1120 that requests the waiting number and is received from the terminal 1120 or is previously recognized by the server 1130 from the particular information regarding the wireless transceiver 1110.

According to another embodiment of the present invention, when the controller 1134 of the server 1130 receives the waiting number request signal for the predetermined service from the external device and there is a detailed service item regarding the predetermined service, the controller 1134 of the server 1130 transmits the detailed service item to the terminal 1120 via the communication unit 1132 of the server 1130, and the terminal 1120 receives the waiting number request signal for the detailed service item from the external device. As described above, when the terminal 1120 supports the detailed service item, the aforementioned step is omitted.

The controller 1134 of the server 1130 determines content based on the waiting time. The controller 1134 of the server 1130 determines content that is used by a user of the external device, for example, an advertisement, music, a video, a peripheral spectacle, a recommended activity, and the like according to the remaining waiting time. For example, when the waiting time is 30 minutes, the controller 1134 of the server 1130 determines content that is displayed in the next 30 minutes. The controller 1134 of the server 1130 determines content by using a content table that has been already stored in the storage unit 1136 of the server 1130 or by a recommendation of an external server. Moreover, the controller 1134 of the server 1130 provides the content itself to the terminal 1120 or provides an address from which content is obtained, to the terminal 1120.

In addition, when detecting a location of the terminal 1120 that requests a waiting number, the controller 1134 of the server 1130 determines content relating to the waiting time and the location of the terminal 1120. The controller 1134 of the server 1130 detects the location of the terminal 1120 based on the particular information of the wireless transceiver 1110 that is positioned close to the terminal 1120. The controller 1134 of the server 1130 must be connected to the wireless transceiver 1110, or the location of the wireless transceiver 1110 must already be stored based on the SSID or MAC address of the wireless transceiver 1110.

The controller 1134 of the server 1130 provides the determined waiting number, waiting time, and content to the terminal 1120 via the communication unit 1132 of the server 1130. The controller 1134 of the server 1130 provides the waiting number, the waiting time, and the content directly to the terminal 1120. When the controller 1134 of the server 1130 is connected to the wireless transceiver 1110, the controller 1134 of the server 1130 provides the waiting number, the waiting time, and the content to the terminal 1120 via the wireless transceiver 1110.

When the user of the terminal 1120 uses the provided content, the server 1130 provides a predetermined profit or benefit to the user of the terminal 1120. The predetermined profit or benefit is provided by providers of the content to be used.

The communication unit 1122 of the terminal 1120 receives the particular information regarding the wireless transceiver 1110 from the wireless transceiver 1110 that is positioned close to the terminal 1120. When entering a zone in which the wireless transceiver 1110 receives a broadcasting signal, the communication unit 1122 of the terminal 1120 receives the particular information from the wireless transceiver. Furthermore, the wireless transceiver 1110 includes address information regarding the server 1130 for providing a service based on the particular information. The wireless transceiver 1110 is an AP, and the particular information regarding the wireless transceiver 1110 includes at least one of SSID and MAC addresses.

The controller 1124 of the terminal 1120 provides an interface for providing a predetermined service. The controller 1124 of the terminal 1120 extracts service information regarding a service to be provided from the SSID or MAC address of the wireless transceiver 1110 and provides an interface for the service. The interface is stored in the storage unit 1126 of the terminal 1120. For example, when the SSID of the wireless transceiver 1110 is "BB bank," the controller 1124 of the terminal 1120 provides an interface for the system. Moreover, the interface includes an interface for a detailed service item. According to another embodiment of the present invention, the controller 1124 of the terminal 1120 receives the service information from the server 1130 when there is no detailed service item.

The communication unit 1122 of the terminal 1120 transmits the waiting number request for providing a service to the waiting number providing server 1130 via the interface and then receives the waiting number for the service, the waiting time, and content based on the waiting time. The output unit 1128 of the terminal 1120 then outputs the received waiting number, waiting time, and content based on the waiting time.

The invention can also be embodied as computer readable codes on a computer readable recording medium. The computer readable recording medium is any data storage device that can store data that can be thereafter read by a computer system. Examples of the computer readable recording medium include Read-Only Memory (ROM), Random-Access Memory (RAM), CD-ROMs, magnetic tapes, floppy disks, optical data storage devices, and the like. The computer readable recording medium can also be distributed over network coupled computer systems so that the computer readable code is stored and executed in a distributed fashion. Also, functional programs, codes, and code segments for accomplishing embodiments of the present invention can easily be construed by programmers of ordinary skill in the art to which the present invention pertains.

While the present invention has been shown and described with reference to certain embodiments and drawings of the portable terminal, it will be understood by those skilled in the art that various changes in form and details is made therein without departing from the spirit and scope of the invention as defined by the appended claims and their equivalents.

What is claimed is:

1. A method of providing content, the method comprising:
   providing an interface for providing a service based on information regarding a wireless transceiver positioned close to an apparatus for providing the content, the information being received from the wireless transceiver;
   requesting a waiting number for providing the service via the interface; and
   receiving the waiting number for providing the service, a waiting time, and the content, wherein the content is provided while waiting for the service and is based on the waiting time.

2. The method of claim 1, further comprising:
   transmitting the information regarding the wireless transceiver, wherein the content includes content relating to the waiting time and a location of the apparatus for providing the content based on the information regarding the wireless transceiver.

3. The method of claim 1, wherein receiving the waiting number for providing the service, the waiting time, and the content based on the waiting time includes receiving the waiting number for providing the service, the waiting time, and the content based on the waiting time from the wireless transceiver positioned close to the apparatus for providing the content.

4. The method of claim 1, further comprising:
   transmitting a usage confirmation signal, when the received content is used; and
   receiving a benefit according to a usage of the content.

5. The method of claim 4, wherein the benefit is provided by a provider of the content.

6. The method of claim 1, wherein the wireless transceiver comprises an access point (AP), and the information comprises at least one of Service Set IDentification (SSID) and Media Access Control (MAC) addresses.

7. An apparatus for providing content, the apparatus comprising:
   a controller for providing an interface for providing a service based on information regarding a wireless transceiver positioned close to the apparatus for providing the content, the information being received from the wireless transceiver; and
   a communication unit for requesting a waiting number for providing the service via the interface and for receiving the waiting number for providing the service, a waiting time, and the content, wherein the content is provided while waiting for the service and is based on the waiting time.

8. The apparatus of claim 7, wherein the communication unit transmits the information regarding the wireless transceiver, and the content comprises content relating to the waiting time and a location of the apparatus for providing the content based on the information regarding the wireless transceiver.

9. The apparatus of claim 7, wherein the communication unit receives the waiting number for providing the service, the waiting time, and the content based on the waiting time from the wireless transceiver positioned close to the apparatus for providing the content.

10. The apparatus of claim 7, wherein, the communication unit transmits a usage confirmation signal and receives a benefit according to a usage of the content, when the received content is used.

11. The apparatus of claim 10, wherein the benefit is provided by a provider of the content.

12. The apparatus of claim 7, wherein the wireless transceiver comprises an Access Point (AP), and the information comprises at least one of Service Set IDentification (SSID) and Media Access Control (MAC) addresses.

13. A non-transitory computer readable recording medium having recorded thereon a program for executing a method of providing content, the method comprising:
   providing an interface for providing a service based on information regarding a wireless transceiver positioned close to an apparatus for providing the content, the information being received from the wireless transceiver;
   requesting a waiting number for providing the service via the interface; and
   receiving the waiting number for providing the service, a waiting time, and the content, wherein the content is provided while waiting for the service and is based on the waiting time.

* * * * *